United States Patent
Blumenthal et al.

(10) Patent No.: US 9,438,355 B2
(45) Date of Patent: Sep. 6, 2016

(54) CONTROL SYSTEMS FOR OPTICAL DEVICES AND SUBASSEMBLIES

(71) Applicant: OE SOLUTIONS AMERICA, INC., Englewood Cliffs, NJ (US)

(72) Inventors: Daniel Jacob Blumenthal, Santa Barbara, CA (US); Henrik N. Poulsen, Santa Barbara, CA (US)

(73) Assignee: OE SOLUTIONS AMERICA, INC, Englewood Cliffs, NJ (US)

( * ) Notice: Subject to any disclaimer, the term of this patent is extended or adjusted under 35 U.S.C. 154(b) by 0 days.

(21) Appl. No.: 13/942,519

(22) Filed: Jul. 15, 2013

(65) Prior Publication Data

US 2015/0365177 A1 Dec. 17, 2015

Related U.S. Application Data

(60) Provisional application No. 61/671,756, filed on Jul. 15, 2012.

(51) Int. Cl.
   *H04B 10/40* (2013.01)
   *H04B 10/80* (2013.01)
   (Continued)

(52) U.S. Cl.
   CPC ........ *H04B 10/801* (2013.01); *H04B 10/0793* (2013.01); *H04B 10/40* (2013.01); *H04Q 11/0066* (2013.01); *H04Q 2011/0083* (2013.01)

(58) Field of Classification Search
   CPC ...................................................... H04B 10/40
   USPC .................... 398/135, 72; 372/34; 385/89
   See application file for complete search history.

(56) References Cited

U.S. PATENT DOCUMENTS

| | | | |
|---|---|---|---|
| 4,797,879 A | 1/1989 | Habbab et al. | |
| 6,817,782 B2 * | 11/2004 | Togami | H05K 9/0058 385/89 |

(Continued)

FOREIGN PATENT DOCUMENTS

| | | |
|---|---|---|
| EP | 1130942 B1 | 8/2011 |
| JP | 2004364042 | 12/2004 |

(Continued)

OTHER PUBLICATIONS

Christian Urricarlet—Finisar Corporation, "XFP: The Ultimate 10Gb/s Transceiver," Dec. 2002-Rev E, 7 pages.

(Continued)

*Primary Examiner* — David Payne
*Assistant Examiner* — Omar S Ismail
(74) *Attorney, Agent, or Firm* — Arent Fox LLP

(57) ABSTRACT

The present invention describes systems 1, 12 and methods for control of optical devices and communications subsystems. The control system comprises ASIC sub-modules and programmable circuitry 25 which may be integrated into a self-contained, stand-alone module. In one embodiment, the module has one or more FPGAs 25 in conjunction with RF and Digital ASICs 30, an integrated cross-connect 36 between the FPGA and digital and RF ASIC building blocks, and an integrated cross-connect 41 between the ASIC and optical circuits and supporting functions. Programmable chip control and other transmission and tuning functions, programmable transponders, and each FPGA/ASIC 25, 30 that is incorporated into a transponder form factor or a host board, can have the same or different functionalities and other parameters including but not limited to modulation format.

12 Claims, 8 Drawing Sheets

(51) Int. Cl.
*H04B 10/079* (2013.01)
*H04Q 11/00* (2006.01)

(56) References Cited

U.S. PATENT DOCUMENTS

| | | | |
|---|---|---|---|
| 7,184,666 B1 | 2/2007 | Li et al. | |
| 7,447,398 B2 | 11/2008 | Hirai et al. | |
| 7,457,389 B2 | 11/2008 | Alderrou et al. | |
| 8,098,993 B2 | 1/2012 | Kirkpatrick et al. | |
| 8,155,520 B1 | 4/2012 | West et al. | |
| 8,204,374 B2 | 6/2012 | Barnard | |
| 8,281,126 B2* | 10/2012 | Noble | H04L 9/0891 380/256 |
| 8,901,474 B2* | 12/2014 | Azadeh | H04B 10/40 250/214 A |
| 2004/0022544 A1* | 2/2004 | Case | H04B 10/40 398/137 |
| 2004/0052521 A1 | 3/2004 | Halgren et al. | |
| 2004/0114699 A1* | 6/2004 | Alderrou | H04L 7/10 375/368 |
| 2005/0089330 A1 | 4/2005 | Grot et al. | |
| 2005/0196119 A1* | 9/2005 | Popovic | H04L 49/3054 385/134 |
| 2005/0286902 A1* | 12/2005 | Pierce | H04B 10/40 398/139 |
| 2006/0291865 A1 | 12/2006 | Margaritis | |
| 2007/0189663 A1 | 8/2007 | Hiral et al. | |
| 2007/0242689 A1 | 10/2007 | Zavadsky et al. | |
| 2007/0248359 A1 | 10/2007 | Pamart et al. | |
| 2007/0269221 A1 | 11/2007 | Handelman | |
| 2008/0131135 A1 | 6/2008 | Dugan | |
| 2008/0292322 A1* | 11/2008 | Daghighian | H04B 10/40 398/192 |
| 2009/0022497 A1* | 1/2009 | Mateosky | H04B 10/40 398/135 |
| 2009/0060502 A1 | 3/2009 | Yi | |
| 2009/0154917 A1 | 6/2009 | Handelman | |
| 2009/0162051 A1 | 6/2009 | Hudgins et al. | |
| 2009/0232492 A1 | 9/2009 | Blair et al. | |
| 2009/0279886 A1 | 11/2009 | Suvakovic | |
| 2009/0279889 A1 | 11/2009 | Kirkpatrick et al. | |
| 2010/0054752 A1 | 3/2010 | Kuribayashi et al. | |
| 2010/0095110 A1 | 4/2010 | Noble et al. | |
| 2010/0229071 A1 | 9/2010 | Ganga et al. | |
| 2010/0322637 A1 | 12/2010 | Hayee et al. | |
| 2011/0058813 A1 | 3/2011 | Boyd et al. | |
| 2011/0076023 A1 | 3/2011 | Chen et al. | |
| 2011/0116792 A1* | 5/2011 | Blumenthal | H04B 10/801 398/43 |
| 2011/0116810 A1 | 5/2011 | Poulsen et al. | |
| 2011/0158658 A1 | 6/2011 | Myslinski et al. | |
| 2011/0229135 A1 | 9/2011 | Gottwald | |
| 2011/0293285 A1* | 12/2011 | Aronson | H04B 10/40 398/135 |
| 2012/0076502 A1 | 3/2012 | Swanson et al. | |
| 2012/0170927 A1 | 7/2012 | Huang et al. | |

FOREIGN PATENT DOCUMENTS

| | | |
|---|---|---|
| JP | 2004364042 A | 12/2004 |
| JP | 2007208591 A | 8/2007 |

OTHER PUBLICATIONS

Sumitomo Electric Industries, Ltd., "Technical Specification for Small Form Factor Pluggable (SFP) Bi-Directional Transceiver," (SBP6H54-GL-B#-31), Jul. 2007, 18 pages.

Wuhan Telecommunication Devices Co., Ltd., "Duplex LC Small Form Factor Pluggable Transceiver," http://www.wtd.com.cn, 17 pages.

Blumenthal, Daniel J., U.S. Appl. No. 13/866,784, filed Apr. 19, 2013, titled System and Methods for Reduced Power Consumption and Heat Removal in Optical and Optoelectronic Devices and Subassemblies.

Blumenthal, Daniel J. et al., U.S. Appl. No. 61/748,415, filed Jan. 2, 2013 titled "Tunable U-Laser With Integrated Mach-Zehnder Modulator".

International Seach Report and Written Opinion of the International Searching Authority for PCT/US2013/050566, mailed Apr. 28, 2014, 14 pages.

\* cited by examiner

CONTROL SYSTEMS FOR OPTICAL DEVICES AND SUBASSEMBLIES

CROSS-REFERENCE TO RELATED APPLICATIONS

This Application claims the benefit of U.S. Provisional Patent Application No. 61/671,756 filed Jul. 15 2012, and is related to U.S. patent application Ser. No. 12/945,470, the contents of both of which are incorporated herein by reference in their entirety.

BACKGROUND

Today's fiber optic based networks use transceivers or other optical subsystems at the interface between electronic systems and the optical fiber communications link or network. A transceiver is generally used to convert between electrical data and optical signals that are transmitted via optical fibers. There are many applications for transceivers ranging from fiber to the home, to data centers to telecommunications, to long haul and high-performance communications and computing. Often, the optical transceiver, responsible for receiving and transmitting optical data from the fiber, is built in a pluggable form. Pluggable transceivers are hot-swappable, input/output transceivers used in data communication and telecommunications networks. These pluggable transceivers interface between communication devices like switches, routers and fiber optic cables, and perform conversions between optical and electrical signals and standardized form factors have been developed as a result of transceiver multisource agreements. Standardized form factors include XFP, QSFP+, SFP, and CFP packages, that includes electrical, optical and mechanical, or power dissipation/usage as well other factors that enable a module to be purchased from different vendors to meet the needs of customers using these pluggables. Standardized pluggable transceivers enable modularity and field replacement functions like hot swapping in addition to the cost and size benefits of a standardized form factor. The use of a standardized form factor allows an optical pluggable transceivers to be connected to fiber transmission systems using any given compatible port of the electronic system.

The performance of the transceiver, as well as its cost, is tied to a particular application. Today, most transceivers are manufactured in a pluggable form factor that can be installed and removed from a linecard or system without turning on and off the system power and allow the transceiver to be inserted and removed from a card cage slot. These pluggables may also be installed internal to the system or on the linecard directly to increase density, or the internal components of the pluggable integrated directly onto the circuitry of the linecard, daughter card or some other module that is used for communications inside the switching or routing equipment. The transceiver interfaces to a host (or client) through several different data processing chips that conform data from the host to the transmission medium and vice versa. In today's transceivers and pluggable transceivers, a microprocessor or microcontroller is used as the central element to run the transceiver module, control the data and other signals as well as monitor the health and behavior of a transceiver. Depending on the choice of cost, size and power dissipation, for smaller form factors the signal processing chips are placed on the host, whereas on larger form factors they can placed inside the transceiver.

Known prior art signal processing and transceiver controls rely on various components that perform electro-optical interfacing and functions such as serialization/deserialization (SerDes), which conforms lower bit rate parallel data to higher bit rate parallel or serial data and vice versa and a PHY which contains functions such as framing, and will insert data to be transmitted into transmission frames, e.g. Ethernet or SONET.

The PHY is a chip or set of chips used to adapt data traffic from the electronic host to the transport medium and vice versa by applying various data and signal processing techniques including but not limited to encoding/decoding, scrambling/descrambling, time alignment for asynchronous data protocols, receiver rate matching for clock frequency compensation and a gear-box function between data and clock traces on a circuit card and the data and clock rates inside the transceiver. The PHY also encodes and decodes data to ensure 50/50% marks and spaces in the data stream and in the process eliminates long sequences of Marks and Spaces, using for instance 8B/10B encoding where each 8 bit sequence is replaced with a 10 bit sequence. It also performs mapping functions, mapping a data stream at one bit rate to another bit rate.

Additionally, a Forward Error Correction (FEC) chip may be used, depending on the implementation, in some known prior art devices. The FEC chip adds another framing and encoding layer to the data to increase resilience to transmission impairments allowing for errors induced to be detected and corrected. Those skilled in the art will be familiar with the various designs and will know that the chips incorporating these functions can be in the transceiver or on the host board depending on the standard employed. It will also be understood by those skilled in the art, that the chips incorporating these functions will only process the IO data and will have no ability to otherwise control transceiver behavior, e.g. laser output power, tunable laser wavelength or temperature.

In presently known transceivers, a microcontroller or microprocessor is used to control the behavior and monitor the health of the transceiver. The microcontroller is a sequential execution machine and if multiple processor cores are used, some level of parallelism may be employed, but the execution is mostly sequential and software driven. Software is run on these chips to execute the required functions and the speed and efficiency as well as the reliability and adaptability of the control is dependent on the performance of the microcontroller/microprocessor and the code implemented. The ability to update or reconfigure the transceiver, or debug its functions as well as the performance like throughput and latency, are often limited by the use of software to handle these functions. The microcontroller/microprocessor is used in conjunction with digital to analog converters (DACs) and analog to digital converters (ADCs). A microcontroller or microprocessor, hereafter referred to as processing units, is a central processing unit (CPU) that contains a number of different peripheral modules to make it a stand-alone functional unit capable of facilitating transceiver monitoring and control. These functional units may include volatile and non-volatile memory, clock, oscillator, serial port, I2C/MDIO/SPI communications ports and Analog-to-Digital Converters (ADC) and Digital-to-Analog Converters (DAC). The DAC and ADC functions can be integrated into special purpose integrated circuits called application specific integrated circuits (ASICs) that are interfaced to the processing units.

Those skilled in the art are familiar with the various designs and electronic circuitry that can be used to combine the different functions, including a SerDes (used to multiplex data from lower to higher data rates and visa versa from higher to lower data rates) and PHY, used with no FEC, or another combination where a SerDes is used with both PHY and FEC. In these cases the PHY can use any combination of internal functions to process the data stream, for instance perform both 8B/10B encoding and subsequent 64B/65B encoding for transmission over SONET. The different bit rate and signal processing function combinations are known to those of skill in the art. An example of a known data synchronization device is described in U.S. Pat. No. 7,457,389, and an example of known interconnections techniques, used in a physical interface modules, is described in US 2010/022907.

However, there are several disadvantages of known technology in this area. For example, today's SerDes, PHYs and FECs are typically separate modules with limited reconfiguration options outside of standards. Thus, a lot of the required functions are performed over several different integrated circuits, losing the flexibility of integrated timing and clock control, resulting in more complex circuitry. Also, as complex functions are implemented in hardware, future transmission systems will have to use the same generic functions to be able to use the same physical SerDes/PHY/FEC parts. This imposes limitations on how future standards are or will be defined. In contrast, networks are engineered, with increasing frequency, not towards standards, but towards requirements that are non-standard and specific to the network. Custom traffic and functional engineering is becoming more and more common. Such non-standard networks typically rely on specialty hardware designed to perform functions not available with current standardized hardware, or have to conform to specifications in standard hardware. In today's MAC and PHY solutions, the processing is controlled by changing register values and thus turning on or off certain hardware implemented functions, e.g. 8B/10B encoding and decoding, in the data path. Thus, the number of functions implemented is limited in both number and degree of flexibility. This means, for example, that a given part can only cover a limited amount of market segments (e.g. SONET and SDH) and that a different part is required for another market segment (e.g., 10 GigE). The result is that a large number of different parts are required to cover the market, thus increasing development, production and operational costs.

The other limitation is related to the use of a sequential processing machine like a microprocessor or microcontroller as the main element in the transceiver. The use of sequential machines to control the many functions described above, in conjunction with auxiliary ASICs, memory elements, and firmware processing devices like FPGAs used as auxiliary input/output devices, severely limits the performance of these systems and approaches, as well as the manufacturability, the cost, the ability to debug and improve operation by installation of updated operational software.

Another limitation is the sequential nature of a microprocessor or microcontroller centric design requires functions and communication to the various data and control functions and circuits to be built out of monolithic code that must be updated as a whole rather than a more efficient hardware implemented architecture, like that of the present invention, that allows multiple individual processes, that can be increased and added without affecting existing processes, to run the various functions of the transceiver in hardware, using concurrent or serial processes, independent or dependent processes, in hardware gate level defined circuits that are programmed in firmware, using software external to the system for programming stages only where real time operation is not based on software.

Another limitation of prior state of the art, is the manner in which the control and data portions of transceivers are connected to the optical to electronic conversion stages, and the various components needed to control the many functions and interact with the data. Today the optical, optoelectronic and in particular photonic integrated circuits (PICs) that communicate between electronic data and the fiber optic network or transmission system are moving towards increasing complexity, with more functions required to be controlled and monitored, including optical power, modulation, transmission and receiving parameters, and in some applications wavelength, temperature and other aspects. Today's optical chips and PICs can vary widely their design and implementation in order to match the cost and reliability of this interface for the desired application. Therefore the design of the electronics that interface between these chips and the electronics described above and the code and functions run on the microprocessors or microcontrollers can vary widely, as well as the circuitry designed into the interfacing ASICs, DACs and ADCs. This wide variability in hardware and control leads to inefficiencies in design across different optical and PICs as well as applications as well as increased cost for ASICs and changes in hardware and software designs as the application dictates different operation performance from the optics/PICs as well as control functions in the processors and the interfacing electronic circuitry.

Accordingly, there is a need for improved methods and apparatus to overcome the above-described limitations in the area of optical devices and subassemblies, including fiber optic transceivers, optical pluggables, board mounted transceivers and other optical communications devices that communicate data between an electronic system and an optical fiber communications system or network.

SUMMARY

According to the present invention, systems, methods and apparatus to process, monitor and manage traffic and operational functions in optical devices and photonic integrated circuits, such as a transceiver module is provided. The invention incorporates a variety of functions including data modulation, wavelength setting, wavelength locking, parameter registration and reporting, optical data detection, and a variety of other functions into optical devices, such as transceiver modules or associated host controllers. The present invention offers a wide variety of flexible options to build and load the capacity of the fiber channel using a multiplicity of similar or same units to leverage advantages known to one skilled in the state of the art without trading flexibility and improving cost, reliability and performance of the fiber link and its engineering and operations and management.

According to one embodiment, optical devices, such as optical transponders, optical pluggables and optical modules and subsystems are provided having one or more of the following (i) The use of an FPGA in conjunction with RF and Digital ASICs, special purpose discrete or integrated electronics or combinations of ASICs and discrete or integrated electronics where the FPGA is used to execute the required control and processing functions instead of using a microprocessor or microcontroller. The present invention overcomes limitations of the prior art by enabling highly programmable, flexible, lower power and small footprint integrated communications, control, monitoring and PHY functions in the optical modules, (ii) integrated cross-connect between the FPGA and digital and RF ASIC building blocks and integrated cross-connect between ASIC and Optical Circuits and supporting functions to provide maximum flexibility of connecting IOs between programmable electronics and analog and digital functions in the optics and supporting optical functions making a high volume electronic apparatus and method to scale to low cost across a wide variety of optical and photonic transmission, communications and network applications, (iii) programmable chip control and other transmission and tuning functions for tunable lasers and for Mach-Zehnder and other types of optical data Modulators, (iv) identical individual transponders software programmable to cover existing and future protocols and transmission formats, (v) where each FPGA and or ASIC that is incorporated into a transponder form factor or a host board, can have the same or different functionalities and other parameters including but not limited to modulation format. As will be understood by those of skill in the art, the term ASIC or ASIC functions refers to both ASICs and discrete components and integrated circuits that are not ASICs but support this set of functions. Discrete or other commercial integrated circuits (commodity) may be used instead of or in conjunction with the ASIC.

According to the present invention, an optical module or subassembly for communication with a host is provided. The optical module or subassembly comprises a transmitter optical subassembly for receiving an optical signal and transmitting an electrical signal, a transmitter drive interface in connection with the transmitter optical subassembly, a receiver optical subassembly for receiving an electrical signal and converting it to an optical signal, and a receiver interface in connection with the receiver optical subassembly.

A control system is provided in the optical module which is in communication with the host. The control system comprises a programmable component and monitoring and processing circuitry. The control and processing circuitry is programmable for implementing into the optical device, the physical and transport layer communications specifications for a plurality of different applications. The control system comprises one or both of FPGA and ASIC circuitry, which preferably, is programmable to match requirements of plurality of form factors. The ASIC circuitry may be monolithically integrated onto the optical device or the ASIC circuitry may be a multi-chip module integrated on the optical device. Preferred monitoring and processing circuitry comprises one or more of MAC, PHY and FEC circuitry, including serialization/deserialization (SerDes), encoding/decoding, scrambling/descrambling, gear-boxing, forward error correction (FEC), laser control and monitoring, and combinations thereof, and in some preferred embodiments is a self-contained unit.

According to another embodiment, a system for use in an optical or optoelectronic device or subassembly is provided. The system has one or more optical modules or subassemblies as described herein, with one or both of a SerDes and a PHY in communication with the host board.

According to another embodiment, an optical communication system is provided. The system comprises programmable circuitry, for example FPGA circuitry, in communication with host circuitry, and monitoring and processing circuitry, for example ASIC circuitry, in communication with the programmable circuitry. One or more photonic integrated circuits are in communication with the monitoring and processing circuitry and the system is programmable as described herein. The optical communication system is capable of communicating with an input signal having a first Gps rate and an output signal having a second Gps rate. The input signal at the first Gps rate and the output signal at the second Gps rate is programmable to different rates to accommodate a plurality of different applications and linecards.

According to another embodiment, the optical communication system comprises a control system in communication with an input interface and an output interface, where the output interface is in communication with a photonic integrated circuit. The control system has a programmable component (e.g., an FPGA) and input and output cross-connects. The control system is programmable between the programmable component and the photonic integrated circuit, using the input cross-connect and the output cross-connect, to provide variable interconnection between the input interface and the output interface. Preferably, the control system is programmable to connect to first and second different photonic integrated circuits.

According to another embodiment, a method of communicating data between an electronic communications system or network and a fiber optic communications system or network is provided. The method comprises first, providing a communication module, the module comprising programmable circuitry in communication with host circuitry. Monitoring and processing circuitry is further provided, which is in communication with the programmable circuitry. One or more photonic integrated circuits are provided which are in communication with the monitoring and processing circuitry. Next, an application for implementation of the communication module is selected. The application has one or more application specific specifications, which are programmable within the communication module. Then, the communication module is programmed to conform to the one or more application specific specifications.

By utilizing fully self-contained, stand-alone, ASIC submodules in conjunction with FPGAs as the core processing building blocks (instead of microprocessors or microcontrollers) data processing and conditioning, it is no longer necessary to have individual electronic modules dedicated to monitoring functions and adaptation between different data rates and a single ASIC and/or FPGA can be used as the basic building block to fulfill the data monitoring and processing requirements. According to the present invention, as programmable circuitry is employed as the central processing engineer in the optical device, the use of sequential control machines and architectures is no longer a limiting condition on the performance and efficiency of the optical device. The inefficiencies and reliability of using software based processing and control inside the optical device and the ensuing costs and limitations are overcome by moving to the programmable circuitry, e.g., the FPGA centric architecture.

The present invention provides flexible connection between the data system, the transceiver data handling and transmission functions as well as the transceiver operation, control and monitoring functions. The present approach alleviates problems with today's multi-module solutions like sparing issues. This approach also enables more flexibility in engineering the transceiver over microprocessor and microcontroller based designs that are also inflexible and specific to certain applications for the optical transmission channel thereby lowering the cost of designing and deploying high capacity fiber optic transmission links.

FIGURES

These and other features, aspects and advantages of the present invention will become better understood from the following description, appended claims, and accompanying figures where:

DETAILED DESCRIPTION

Figure 1:
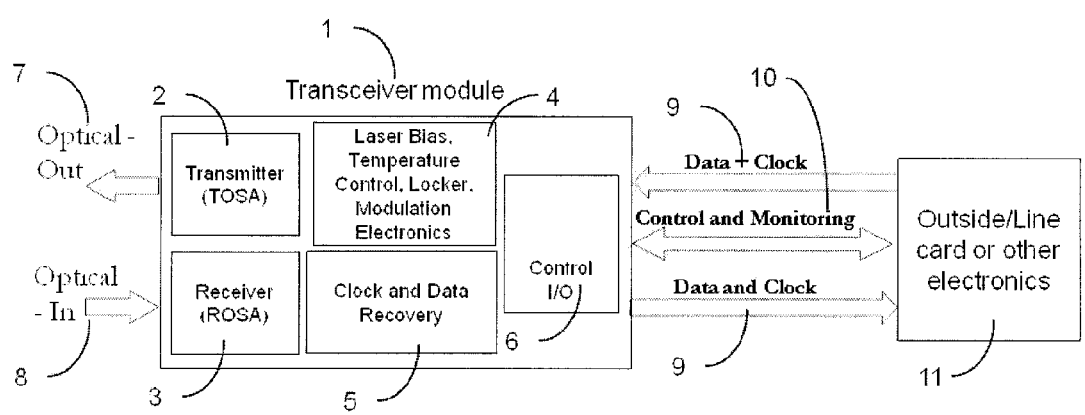
FIG. 1 illustrates an exemplary transceiver module according to one embodiment of the present invention.

According to the present invention, systems and methods are described for use in fiber optic devices and subassemblies such as transceivers, optical pluggables, optical subassemblies and other communication devices and subassemblies for communication with host electronic boards which communicate data between an electronic system and an optical fiber communications system or network. According to one embodiment, a system for use in optical devices and subassemblies comprising integrated communications, control, monitoring and PRY functions which is programmable is provided. The system, when integrated into the optical devices and subassemblies, results in a device which flexible, lower power and has a small footprint.

As described herein, the present invention overcomes the limitations of known technology in optical devices and subassemblies. There are several basic elements of the invention including (i) a control system comprising programmable circuitry, such as an FPGA in conjunction with control and processing circuitry, such as ASICs to communicate between the analog and digital signals and handle auxiliary specific functions are employed instead of microcontrollers, (ii) within the control system, individual FPGA functions in conjunction with ASIC functions for implementation of a particular application into the optical device, these ASIC functions may include but not limited to serialization/deserialization, encoding/decoding, scrambling/descrambling, gear-boxing, Forward Error Correction (FEC), and laser control (e.g. laser temperature control) and monitoring are assembled as a multi-chip integrated component or a monolithic integrated component on the programmable device instead of a plurality of separate parts, (iii) the control system, including the FPGA and/or ASIC, or corresponding assembly, as a fully functional integrated unit, comprises of a self-contained MAC/PHY/FEC/controller that performs data processing and control between a host board and a transceiver and internal transponder control and monitoring functions, (iv) the control system, including the FPGA and/or ASIC, or corresponding assembly, that is incorporated into a transceiver form factor or other optical device, can have the same or different functions and specifications (e.g. data encoding) and other parameters including but not limited to modulation format, (v) that each FPGA and/or ASIC that is incorporated into a transceiver form factor, by firmware can be programmed to match the requirements of the transceiver form factor it is placed in (e.g. data encoding).

As referred to herein, the following terms have the following meanings.

The term "application" when used herein, in reference to optical communications, refers to the physical or transport layer communications requirements driven by the usage of the transceiver in terms of performance, cost, reliability and other factors relevant to an application. For example fiber links for fiber to the home, fiber links for connecting routers, fiber links for inside or between data centers, fiber links for metro networks, fiber links for long haul networks and fiber links for high performance computing are among examples of how the applications can drive the requirements of the fiber transmission system and therefore the transceivers.

The term ASIC means an application specific integrated circuit and refers to any subset of electronic circuitry that has been designed for high performance and high levels of integration to perform specific, and mostly non-programmable functions. Portions of the electronic architecture that are fixed, and can be implemented with a fixed design that will not change or does not need to change, can be implemented in an ASIC. There is usually a high front end cost associated with designing and producing an ASIC, where the per piece cost decreases as the volume increases and the cost, size and power dissipation of the ASIC for the fixed set of electronic functions implemented can be more efficient that using discrete electronic components that realize the same functions as the ASIC. The term ASIC or ASIC functions refers to both ASICs, as defined above, and discrete components and integrated circuits that are not ASICs but support a set of ASIC like functions. Discrete or other commercial integrated circuits (commodity) may be used instead of or in conjunction with the ASIC.

The term FEC means forward error correction (FEC) or channel coding and refers to the technique of controlling errors in data transmission. FEC may be implemented in hardware, software or a combination of the two.

The term FPGA means field-programmable gate array and refers to a circuit designed to be configured after manufacturing, including the ability to update the functionality, partial reconfiguration, and reconfigurable interconnects. An FPGA realizes logical functions and the equivalent of analog circuits, digital processing. Analog and/or digital signal processing, and control algorithms as independent processes configured into actual hardware gate level implementations inside the chip. As a consequence the algorithms, and data processing and control function are run on parallel and/or serial hardware that is very fast and programmable. This programming is done via firmware so software not run in the FPGA rather software is only used to initially load and update when needed the firmware. Other advantages of the FPGA as the central processing and control unit, are apparent to one skilled in the art, where processes or functions may be enabled or disabled as well as updated independent and without affecting other functions. Advantages include flexibility, the ability to turn off processes when not needed to save power without affecting other processes, the ability to turn on and off process for different PIC designs and applications or to enable or disable processes according to the level of usage or paid subscription the user has for the module among many other advantages. The architecture, method of coding, manufacturing and operation of FPGAs is much more efficient as well as easier to debug than complex software codes used in microprocessor or microcontroller based architectures. Additionally, the control and/or data may be run through the FPGAs, with sections of circuits turned on and off to conserve power without affecting other processes and data. The way in which the processes and code are developed, debugged and implemented in FPGAs is much more efficient and easier to debug than in complex software driving sequential state machines. Additionally, auxiliary input/output function as well as ASIC circuits may be integrated more closely or even with the FPGA into what is called mixed signal programmable packages.

The term MAC means media access control, also referred to herein as a media access control (MAC) layer and refers to the level of the handling of data that controls how the higher level data accesses the physical layer and communications channel and network. The way data is able to get on and off the PHY layer and network is handled by the media access control (MAC) layer that is one layer above the PHY layer.

The term PHY refers to the means by which data is communicated over the physical layer, like optical fiber vs. coaxial cable, and with optical fiber what type of fiber, the distance of communication, the bit rates and other attributes of the physical communications medium must be handled in the PHY layer. By decoupling the PHY and MAC layers, a particular MAC layer may communicate over one of many PHY layers or systems. And vice versa, a PHY layer may be reused across many different MAC layers, providing many economical and other efficiencies and reuse of technologies.

Referring now to FIGS. 1-2 and 3-8, illustrations of exemplary devices and subassemblies and systems are shown, where like numbers refer to like elements.

Referring now to FIG. 1, an illustration of an exemplary module 1 is shown. The module 1, is a programmable optical device that incorporates the control system according to the present invention. The exemplary module 1 shown in FIG. 1 is a conventional single channel or multi-channel fixed or tunable wavelength tunable module, illustrated by way of example as an XFP or SFP package. However, as will be understood by those of skill in the art, this module 1, sometimes referred to as form factor, can be any transponder, standard or customized or other optical device used in optical communication. Inside module 1 are various components and subassemblies to realize the function of a transceiver that converts data between electrical and optical. These components and subassemblies include but are not limited to digital and analog circuits and transmitter drive interface and connections 4, circuit cards and connectors 9, 10, receiver interfaces and connections 5, transmitter subassemblies like the Transmitter Optical Subassembly (TOSA) 2, which communicates optical data via the optical output 7 and their equivalents, and the Receiver Optical Subassembly (ROSA) 3 and their equivalents, which receives optical data via the optical input signal 8 and control system 6. The ROSA 3 includes a photodetector that converts the optical signal to an electronic signal, and electronics like a trans-impedance amplifier to convert the detected signal to be converted to an electronic voltage, amplifiers electronics and other electronics and/or optics used to recover the data and clock from the incoming signal. The TOSA 2 and ROSA 3 also contain optical connections to enable an optical fiber to be connected as input and output fibers 7, 8 for the transceiver module to communicate to the outside line card or other electronics 11. To one skilled in the art there may be other functions not described herein, such as those described in U.S. patent application Ser. Nos. 12/945,264 and 13/866,784, incorporated herein by reference in their entirety.

The control system 6 is the core processing building block of the optical system of the present invention, and the control system 6 is the main monitoring and control communications interface 10 between the module 1 and the host board 12 (not shown). The control system 6 is in electrical communication with the host board and comprises control circuitry having processing capability. In addition, the control system 6 samples control and/or monitoring signals in the optical device and other devices that are utilized in the module to support the required communications and specifications, and communicates at least a portion of the control or monitoring signals to the host board. The control system 6 may have a built-in clock and/or data recovery and limited or extensive processing capabilities. The control system 6 is capable of sampling various analog and digital control and monitoring signals in the module 1 and communicating these to the host board. Preferably, the control system 6 comprises an FPGA as the programmable central processing engineer and an ASIC is used to incorporate the monitoring and processing circuitry, in particular, the ASIC is used to incorporate specific functions into the control system 6, like. ADC and DAC as well as others that augment the programmable aspect of the FPGA. Although the control system 6, FPGA and ASIC components are illustrated herein as discrete modules, it will be understood by those of skill in the art that the individual components of the control system 6 may be incorporated into a multi-chip integrated module or monolithically integrated on a module or other optical device.

Although the invention is described herein with reference to a module or form factor, the invention may be incorporated into an alternate form of fiber optic transceiver. In this embodiment, the programmable optical device, e.g., programmable transceiver, or components thereof is mounted directly to a circuit card, linecard, or daughter card of a communications system. The advantage of this embodiment is that it increases the communications density and level of integration.

Figure 2:
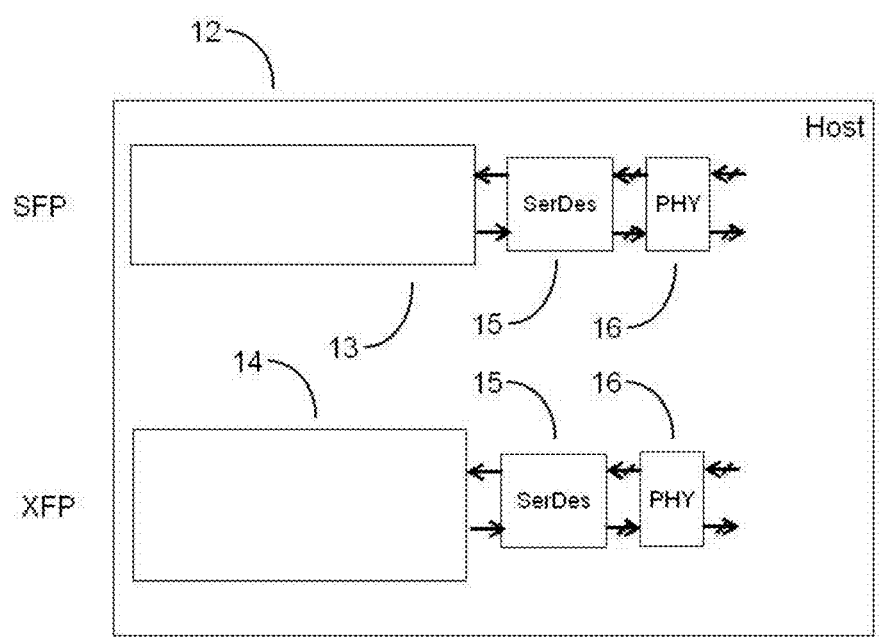
FIG. 2 illustrates an exemplary module according to another embodiment of the present invention.

Referring now to FIG. 2, two exemplary programmable optical modules, such as an SFP 13, and XFP 14 form factor are shown on a host board 12 according to another embodiment of the present invention. The programmable optical modules 13 and 14 incorporate the control system of the present invention, as described above with respect to FIG. 1. In this embodiment, as shown in FIG. 1, between the SFP 13 or XFP 14 and the host board 12 is a SerDes circuitry 15 to aggregate lower bit rate traffic to the higher line rate of an optical output interface. Between the host board 12 and the SerDes 15 is, according to the embodiment shown in FIG. 2, a PHY 16. The PHY 16 can perform functions including, but not limited to gearbox functions, protocol adaptation, scrambling and descrambling, encoding and decoding. As will be understood by those of skill in the art with reference to this disclosure, there may be other functions not listed. In this embodiment of the invention the PHY 16 and SerDes 15 layer can be inside the module or outside the module, depending on the module type. To one skilled in the art there may be other embodiments not listed.

Figure 3:
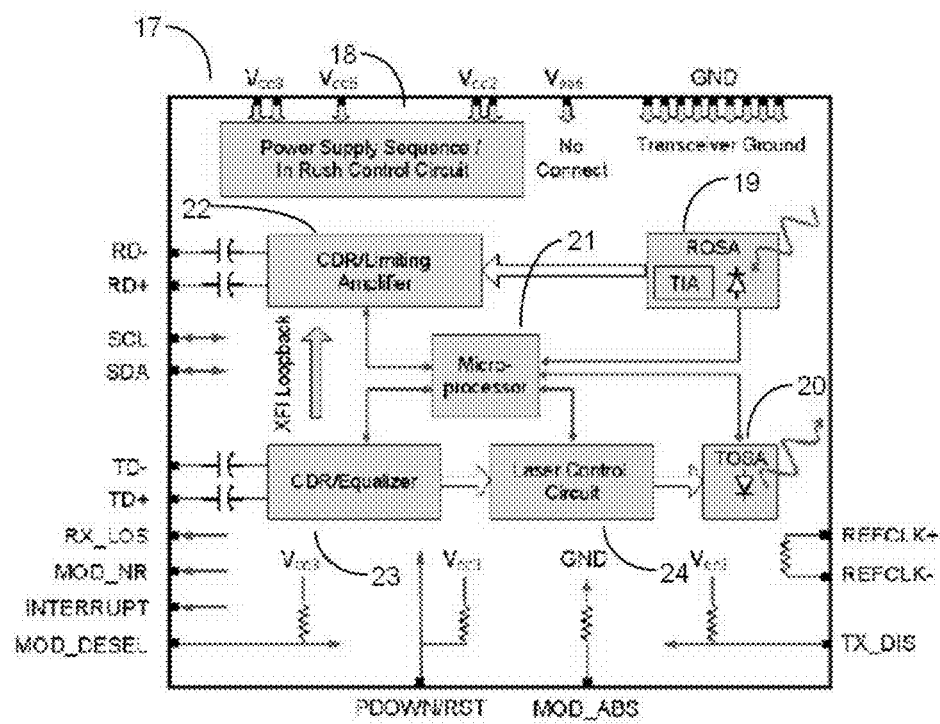
FIG. 3 illustrates an exemplary prior art transceiver device.

Referring now to FIG. 3, an example of a prior art form factor, an XFP module 17 is shown. The form factor 17 has sequencing circuitry 18 that upon power-up ensures the all components of the device are powered up in the correct sequence. A receiver optical subassembly (ROSA), with built-in trans-impedance amplifier (TIA) 19 converts received optical signals to electrical signals. The electrical signals are sent to a clock and data recovery (CDR) and limiting amplifier 22 and sent to the host board. From the host board is received the transmit signal by a CDR/equalizer 23, which can perform functions including, but not limited to, timing between output interface and host board and signal equalization due to interface transmission limitations. In line is laser control circuitry 24 that controls the behavior of the laser and the transmitter optical subassembly (TOSA) 20 facilitating the conversion of electrical data to optical for transmission.

As shown in FIG. 3, an illustration of a prior art device, a sequential machine like a microprocessor or microcontroller 21 is used as the main control element. The main control element interfaces to other elements like ASICs, or possibly FPGAs outside the form factor. The present invention utilizes the FPGA as the central control system, where concurrent processes can be implemented, interfaced to the various data and digital and analog control functions and measurables. The FPGA implements algorithms, digital processing, analog processing, analog and digital circuit and signal processing and conditioning function in gate level logic. There is therefore an inherent advantage of the FPGA as the central control element over a sequential machine the design, coding, updating, debugging and operational characteristics. Additional advantages include the ability to turn on an off features and functions without affecting other functions to reduce power, complexity as well as utilize the programmable and reprogramming aspects to make this architecture more flexible design and operation than the prior art microprocessor or microcontroller based design.

Figure 4:
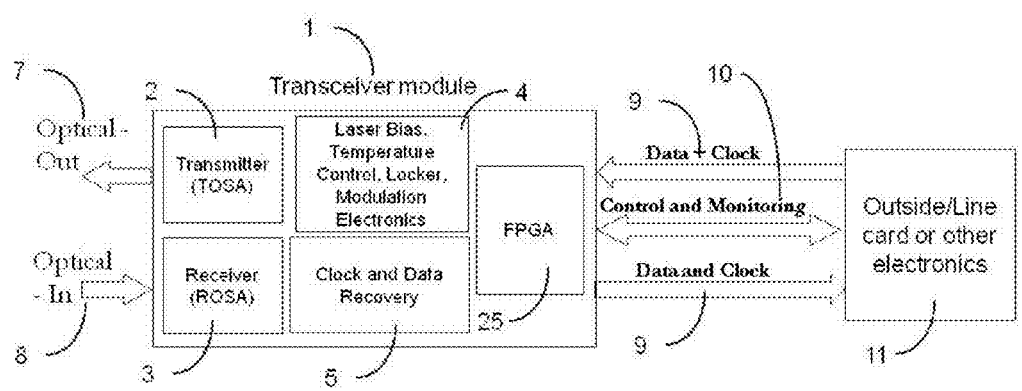
FIG. 4 illustrates an exemplary transceiver module according another embodiment of the present invention.

Referring now to FIG. 4, an exemplary module 1 according another embodiment of the present invention is shown. The module 1 is a programmable optical device, which can be a single channel or multi-channel fixed or tunable wavelength tunable module, shown by way of example as an XFP or SFP package. However, as will be understood by those of skill in the art, the module 1, sometimes referred to as form factor, can be any pluggable transponder standard or customized. Inside the module 1 are various components to realize the function of a transceiver that converts data between electrical and optical. These components and subassemblies include but are not limited to digital and analog 4 circuits and circuit cards and connectors 9, 10, transmitter drive interface and connections 4, receiver interfaces and connections 5, transmitter subassemblies like the Transmitter Optical Subassembly (TOSA) 2 and the Receiver Optical Subassembly (ROSA) 3 and FPGA/ASIC control circuitry 25. The FPGA/ASIC control circuitry 25 is the main monitoring and control communications interface 10 between the module 1 and the host board 12 (not shown). The FPGA/ASIC 25 can have built-in or external clock and/or clock and data recovery and advanced processing capabilities including signal processing and/or data processing. To those of skill in the art, it will be understood that there may be different combinations of FPGA and/or ASIC constellations for the FPGA/ASIC 25. It could include, but not limited to, as FPGA alone or an ASIC alone or a combination of an ASIC and an FPGA, either separately or integrated. The ROSA 3 includes a photodetector that converts the optical signal to an electronic signal, and electronics like a transimpedance amplifier to convert the detected signal to be converted to an electronic voltage, amplifiers electronics and other electronics and/or optics used to recover the data and clock from the incoming signal. The TOSA 2 and ROSA 3 also contain optical connections to enable an optical fiber to be connected as input and output fibers for the transceiver module. To one skilled in the art there may be other functions not described herein.

Referring now to FIGS. 5, 6, 7, and 8, there is shown the control system according to the present invention, including various implementations of control and processing circuitry of the control system according to the present invention. The control and processing circuitry may be may be implemented into devices such as transceivers and other optical devices and subassemblies. The control and processing circuitry comprises a programmable component, which preferably serves as the central processing engineer in the device. The programmable component may be an FPGA or other equivalent programmable gate circuitry, for example a PLD or other programmable circuitry that is programmed to serve specific processing and other functions. The control and processing circuitry also comprises monitoring and processing circuitry within the control system. The monitoring and processing circuitry may be an ASIC, or equivalent circuitry which functions to implement a particular application into the optical device. Particular functions which may be included in the monitoring and processing circuitry may include but not limited to serialization/deserialization, encoding/decoding, scrambling/descrambling, gear-boxing, Forward Error Correction (FEC), and laser control (e.g. laser temperature control) and monitoring, digital to analog conversion (DAC) and analog to digital conversion (ADC). The programmable component (e.g., FPGA) and control and processing circuitry (e.g., ASIC or corresponding equivalent circuitry) may be assembled as a multi-chip integrated component or a monolithic integrated component on the programmable device.

Figure 5:
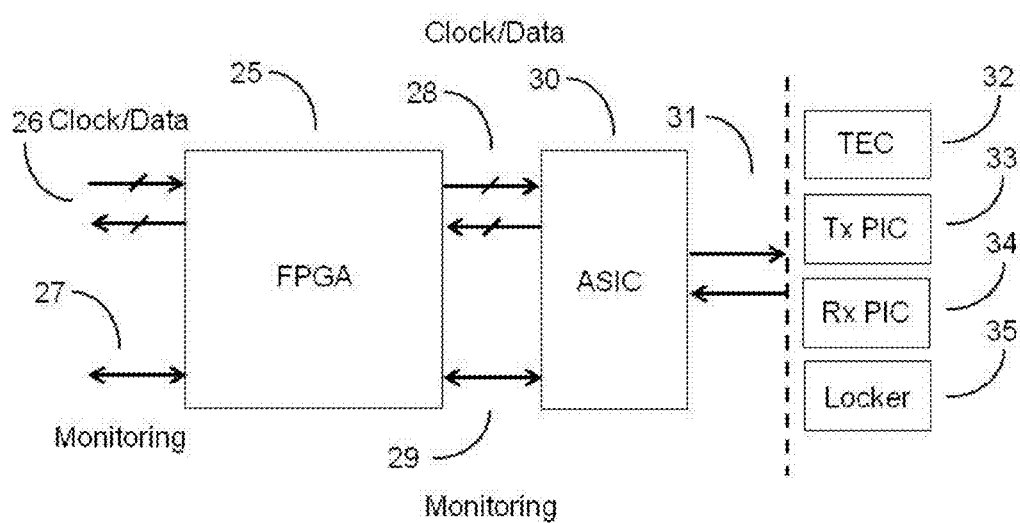
FIG. 5 illustrates exemplary control and processing circuitry according to another embodiment of the present invention.

Referring now to FIG. 5, another exemplary embodiment of the control system of the invention is shown. FIG. 5 illustrates one embodiment of the control and processing circuitry according to the invention. As shown in FIG. 5, the control and processing circuitry comprises a programmable component, shown as an FPGA 25 and control and processing circuitry, shown as an ASIC 26. The FPGA 25 sends and receives data from the host controller (not shown) through a high bit rate data and clock interface 26. It also sends and receives monitoring and control data to the host board through the control interface 27. The FPGA 25 has significant processing capabilities with large memory for buffering and/or data storage. Following the FPGA is an ASIC 30 or combination of circuits that implement the desired functions, preferably containing monitoring and processing circuitry that could be a custom design or known, e.g., commonly used commercially available designs. In one use preferred embodiment, data is passed between the FPGA 25 and the ASIC or other application specific control and processing circuitry 30 using a high bit rate data and clock interface 28. In another preferred embodiment, cases, the data can bypass the FPGA 25 (or bypass the circuitry inside the FPGA or by design) and other monitoring and control functions handled by the FPGA 25. Using the programmable component, such as an FPGA or other programmable circuitry, as the centric architecture there is more flexibility than a microprocessor based architecture. There is also control and monitoring data passed between the programmable central processing, e.g., the FPGA 25 and the ASIC 30 or other corresponding circuitry through the control interface 29. As will be understood by those of skill in the art, there may be other communications interface and/or combinations not listed. At the output of the ASIC 30 in this embodiment of the invention different modules and/or control functions can be connected. In this example is shown a Thermoelectric Cooler (TEC) 32, a transmitter Photonic Integrated Circuit (Tx-PIC) 33, a receiver Photonic Integrated Circuit (Rx-PIC) 34 and wavelength locker 35. As will also be understood by those of skill in the art, other modules and/or control functions may be incorporated into the device, not expressly described with respect to this embodiment.

Figure 6:
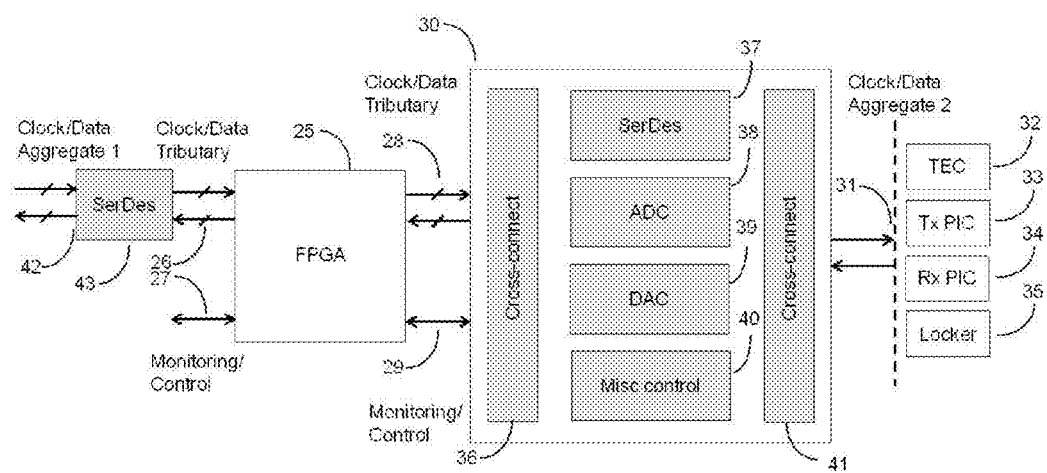
FIG. 6 illustrates exemplary control and processing circuitry according to another embodiment of the present invention.

Referring now to FIG. 6, another exemplary embodiment of the control and processing circuitry is shown. The control and processing circuitry shown in FIG. 6 comprises a programmable component, shown as an FPGA 25 and monitoring and processing circuitry, shown an expanded view of an ASIC 30. In FIG. 6, the FPGA 25 is shown as sending and receiving receives data from the host controller through a high bit rate data and clock interface 26. However, the FPGA 25 may or may not be used in the data path, such a choice being programmable as bypass function or by design such that the data and clock interface are configured to bypass the FPGA 25, as will be understood by those of skill in the art. The FPGA 25 also sends and receives monitoring and control data to the host board 12 (not shown) through the control interface 27. The FPGA 25 has significant processing capabilities with capabilities for large memory for buffering and/or data storage. In this case the FPGA can be used to very fast and efficiently process signal processing algorithms, and higher level data processing functions. The usage of the FPGA with the data will depend on the applications, its requirements and the cost, power and other considerations. The flexibility of the FPGA based design can bypass the data past the FPGA for certain applications and requirements. Following the FPGA 25 is an ASIC 30, preferably containing custom monitoring and processing circuitry. Data is passed between the FPGA 25 and the ASIC 30 using a high bit rate data and clock interface 28. There is also control and monitoring data passed between the FPGA 25 and the ASIC 30 through the control interface 29. As will be understood by those of skill in the art, other communication interfaces and/or combinations not listed may be incorporated into the control and processing circuitry. In the embodiments where the FPGA 25 handles the data, the FPGA 25 has, at the input interface 26, a SerDes 43 connecting to the host board 12. As will also be understood by those of skill in the art, the ASIC 30 may contain a number of different modules. In one embodiment, described herein, is shown an input cross-connect 36, and output cross-connect 41 and in between a SerDes 37, Analog-to-Digital Converters 38, Digital-to-Analog Converters 39 and miscellaneous control functions 40. Other modules and/or functions not listed may also be incorporated into the ASIC 30. At the output of the ASIC 30, according to this embodiment of the invention, different modules and/or control functions may be connected. In this example is shown a TEC 32, a Tx-PIC 33, a Rx-PIC 34 and wavelength locker 35. Other modules and/or control functions not listed may also be connected to the ASIC 30. By utilizing the input cross-connect 36 and output cross-connect 41 any function and/or module inside the ASIC 30 can, through the output interface 31, be connected to any of the modules after the ASIC 30 such as 32, 33, 34, 35.

Figure 7:
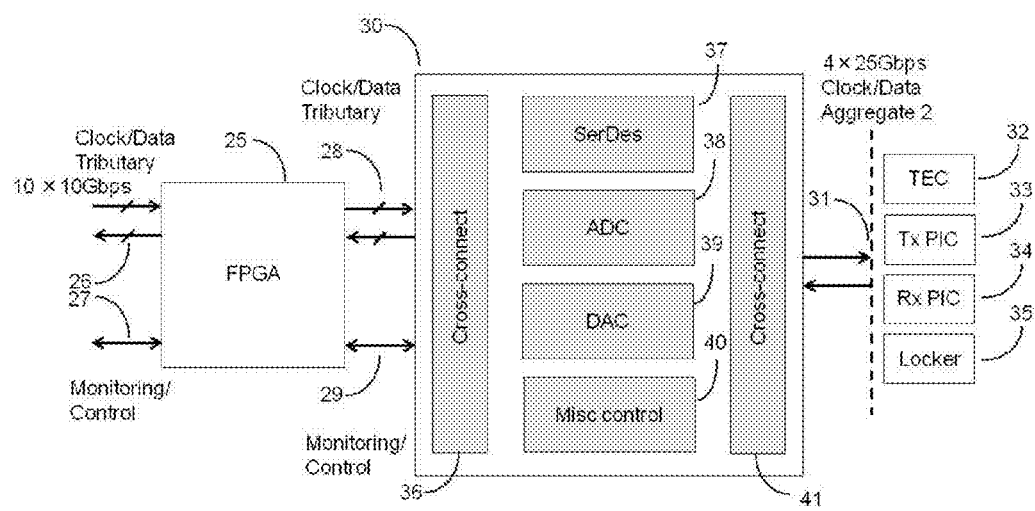
FIG. 7 illustrates exemplary control and processing circuitry according to another embodiment of the present invention.

Referring now to FIG. 7 another exemplary embodiment of the control and processing circuitry is shown. According to the embodiment shown in FIG. 7, the control and processing circuitry comprises a programmable component, shown as an FPGA 25 and control and processing circuitry, shown as an expanded view of the components of an ASIC 30. The FPGA 25 sends and receives data from the host controller (not shown) through a high bit rate data and clock interface 26. The FPGA 25 also sends and receives monitoring and control data to the host board (not shown) through the control interface 27. The FPGA 25 has significant processing capabilities with large memory for buffering and/or data storage. Following the FPGA 25 is an ASIC 30, preferably containing custom or standard or a combination of the two for monitoring and processing circuitry. Data is passed between the FPGA 25 and the ASIC 30 using a high bit rate data and clock interface 28. There is also control and monitoring data passed between the FPGA 25 and the ASIC 30 through the control interface 29. As will be understood by those of skill in the art, there may be other communication interfaces and/or combinations not described herein but within the scope of the invention. According to this embodiment, the FPGA 25 has at the input interface 26 10 Parallel data lines each carrying 10 Gbps bidirectional data, this aggregating 100 Gbps. The control and processing circuitry, shown as an ASIC 30 can contain a number of different modules, either monolithically integrated or as separate integrated modules. In the embodiment shown in FIG. 7, the control and processing circuitry 30 comprises an input cross-connect 36, and output cross-connect 41 and in between a SerDes 37, Analog-to-Digital Converters 38, Digital-to-Analog Converters 39 and miscellaneous control functions 40. As will be understood by those of skill in the art, other modules and/or functions not described herein may be implemented according to the invention. At the output of the ASIC 30, according to this embodiment, different modules and/or control functions can be connected via 4 parallel lines each carrying 25 Gbps data, aggregating 100 Gbps, in this example is shown a TEC 32, a Tx-PIC 33, a Rx-PIC 34 and wavelength locker 35. As will be understood by those of skill in the art, there may be other modules and/or control functions not described herein which are within the scope of the invention. By utilizing the input cross-connect 36 and output cross-connect 41 any function and/or module inside the ASIC 30 can through the output interface 31 be connected to any of the modules or input/output connections after the ASIC 32, 33, 34, 35.

Figure 8:
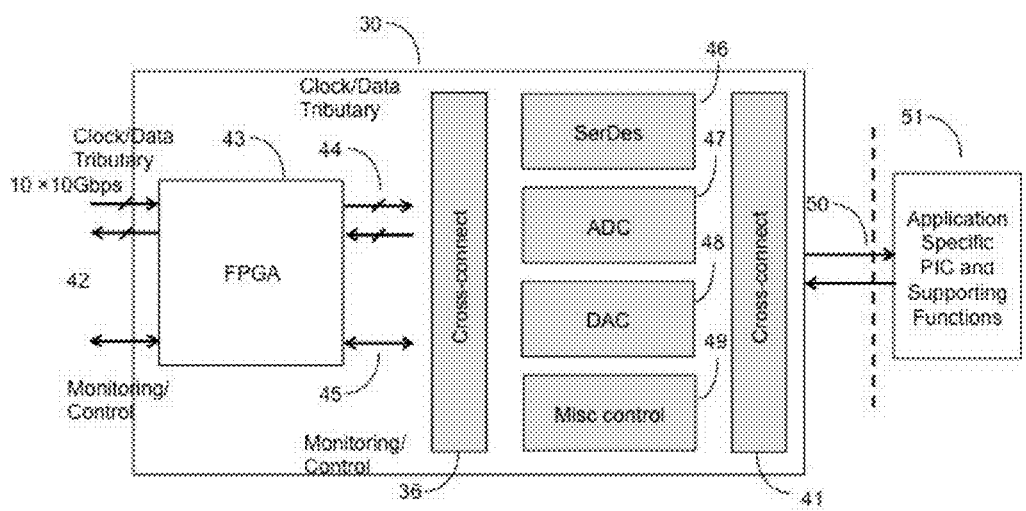
FIG. 8 illustrates exemplary control and processing circuitry according to another embodiment of the present invention.

Referring now to FIG. 8, another exemplary embodiment of the control and processing circuitry is illustrated. As shown in FIG. 8, the FPGA 43 and the associated crossconnects 36, 41 and other ASIC functions like SerDes 46, ADC 47, DAC 48 and other control functions 49 are integrated in multi-chip modules or monolithically and communicate as a single high volume, programmable optical chip, PIC or application specific circuit and its supporting functions 51 over bidirectional communications lines 50. The present invention is very different in approach and architecture and method than related and prior art in that herein described there is now a broad variety of optical chip or PIC that can be controlled using the same or a similar class of programmable circuits (e.g., FPGA) and control and processing circuits (e.g, ASIC or corresponding equivalent circuitry).

Referring again to FIGS. 6-8, cross-connects 36 and 41 are shown. According to the present invention, the control system is programmable between the FPGA and the PIC using the cross-connects to allow variable interconnection between the FPGA (or module) inputs and outputs and the control, monitoring and data functions e.g., 37, 38, 39 and 40 and a second programmability between the control, monitoring and data functions e.g., 37, 38, 39 and 40 and the PIC or optoelectronic devices and its elements. These first and second cross-connects 36 and 41 allow for a variable, i.e., programmable connection to different PICs and optoelectronic module configurations.

The advantages of the present invention over prior art, includes but are not limited to: Using programmable circuitry, such as an FPGA instead of a microprocessor or microcontroller as the central processing and control element. The FPGA is a fundamentally different apparatus and control method than a microcontroller or microprocessor, where an FGPA is an organization of logic elements and Boolean functions that can be arbitrarily connected together using an internal on chip interconnect, as well as containing other general purpose digital gate functions for retiming buffering, etc. The FPGA is more general purpose than the microcontroller and better suited for the applications intended for this invention as different mappings can be loaded into lookup tables to control photonic integrated circuit (PIC) functions and application specific DAC and ADC functions as well as implement codes, algorithms, physical layer framing, temperature tables, and other functions that can be generically programmed between the external electronics (to the optical module) and the optical circuit that communicates between the electronics and the optical fiber. The FPHGA can be used to implement circuit designs or processing algorithms among other signal and digital processing functions. In known prior art, the FPGA is located outside the optical pluggable module or used in conjunction with the microprocessor or microcontroller. This invention is new in the use of solely the FPGA and the addition of integration of ADC and DAC functions using interconnects and tighter integration enabling high volume of a general purpose PIC or Application specific optical circuit to be built. Examples of the functions the FPGA/ ASIC is used for include but are not limited to control chirp of the transmitted optical signal, control of temperature of temperature sensitive components (laser, etalon, etc), control laser output power, control laser wavelength of tunable laser, control and monitor wavelength locker, implement larger memory capabilities at lower powers for lookup, calibration and other functions. Other improvements over prior art include autonomous control of the optical module for high redundancy and fault tolerance. For example, if Control interface to host fails the unit can still continue to operate within specifications, laser output power deteriorates or laser wavelength shifts the FPGA can take corrective action. The present invention has other advantages over prior art, resulting in greater flexibility the microcontroller and PHY/FEC chips in terms of reconfigurability, can perform framing/deframing, encoding/decoding, scrambling/ descrambling. A key benefit and advantage of the present invention over prior art is elimination of gearbox circuits that are used as stop gap measures to match circuit card trace bandwidths to module bandwidths. For example, a circuit card that contains 10×10 Gpbs Ethernet line traces to yield 100 Gbps Ethernet would require a separate chip to communicate to an optical pluggable that operates with 4×25 Gbps. This separate chip called a gearbox, occupies more space, dissipates more heat, consumes more power and costs more money. The present invention uses the FPGA and associated integrated (multi-chip or monolithic) approach with serializers and deserializers where the input to the FPGA can run native 10 Gbps per input and the output of the FPGA is connected to 25 Gbps serializers that communicate to the optical PIC or application specific circuit. The flexibility in programming the FPGA and associated circuitry has broad implications in making an optical pluggable the fits the needs of many applications and linecards. For example, in one use case, the FPGA can be programmed to perform 8B/10B and/or 64B/65B encoding/decoding and then by loading new firmware, the modules can accommodate custom encoding/decoding. Using integrated SerDes, ADCs/DACs, TEC control and other modules sandwiched between cross-connects any input can be mapped to any output and a large number of different pin-outs can be served. As mention prior, using SerDes integrated in monolithic or multi-chip, no external SerDes chip set is required. The ADCs/DACs can be sandwiched between cross-connects and therefore using the present invention, a large number of different analog functions can be controlled by FPGA firmware. The present invention allows new functions to be implemented by adding firmware modules and it is not required to make new hardware. Therefore, future applications can be met by reprogramming of firmware using already existing hardware modules saving money in deploying new modules and allowing reuse of a same part across multiple applications reducing inventory, spare parts and the costly overhead associated with multiple parts.

In terms of engineering new designs and products, the present invention provides a large degree of freedom in designing and implementing custom optical networks with for example proprietary protocols, encoding, encryption. This invention allows the concept of one chip fits many applications results in increased volume and lowers the cost of significantly.

By utilizing fully self-contained, stand-alone, FPGA and/ or ASIC modules as the basic building block of the transceiver modules, it is no longer necessary to have individual modules dedicated to individual designs and a single FPGA and/or ASIC design can be used as the basic building block to fill all the transceiver modules. This approach alleviates problems with today's large number of different parts for different function, like sparing issues and inventory. This approach also enables more flexibility in engineering the transceiver modules thereby lowering the cost of designing and deploying high capacity fiber optic transmission links using transceivers.

There are other advantages that can be appreciated by one skilled in the art, for example using the same building block (the single FPGA/ASIC) for many diverse designs the hardware manufacturing costs can be significantly reduced. Likewise, firmware/software costs can be significantly reduced as many firmware sub-modules can be the same and only the differing parts of the firmware need to be programmed. And once a firmware sub-module has been programmed it is reusable for similar designs. This approach lowers the cost in manufacturing, lowers the cost in having to test only one part prior to installing, increases volume of the basic element (the FPGA and/or ASIC) that can be used in any form factor across a wide variety of applications and architectures lowers the cost of the technology.

There are other aspects and advantages of this invention which will be appreciated by those of skill in the art. The FPGA and/or ASIC in any of the form factors are able to be programmed and run individually independent of any other cards. In this invention there is a master interface between the outside that handles communications standards for controlling the transceiver, communicating data and other functions. This master interface in this invention is also used to poll the status of the sub-modules in a transceiver form factor as part of the FPGA and/or ASIC control and monitoring functions, and can act as a watch-dog to build fault tolerance and redundancy into the transceiver. One skilled in the art can appreciate the case examples where the interface has a fault or a laser has started to deteriorate, but has not stopped functioning. In the present invention the individual transceiver is able to fully operate at the desired specifications as the FPGA and/or ASIC will be able to take corrective action.

While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. And, although the present invention has been discussed in considerable detail with reference to certain preferred embodiments, other embodiments are possible. Therefore, the scope of the appended claims should not be limited to the description of preferred embodiments, methods, and examples contained herein.

What is claimed is:

1. An optical module or subassembly for communication with a host board, the optical module or subassembly comprising:
   a transmitter optical subassembly for receiving an electrical signal and converting the received electrical signal into an optical signal;
   a transmitter drive coupled to the transmitter optical subassembly;
   a receiver optical subassembly for receiving an optical signal and converting the received optical signal into an electrical signal;
   a receiver interface coupled to the receiver optical subassembly; and
   a control system in electrical communication with the host board,
   wherein the control system comprises:
      a programmable central processing device including a field programmable gate array (FPGA);
      monitoring and processing circuitry including application specific integrated circuit (ASIC), wherein the monitoring and processing circuitry is coupled to the programmable central processing device and is programmable for implementation into an optical device physical and transport layer communications specifications for a plurality of different applications, and includes analog-to-digital conversion (ADC) and digital-to-analog conversion (DAC) functions, and wherein the monitoring and processing circuitry is configured to be in communication with photonic integrated circuits including a thermoelectric cooler (TEC), a transmitter photonic integrated circuit (Tx-PIC), a receiver photonic integrated circuit (Rx-PIC), and a wavelength locker;
      a high bit rate data and clock interface coupled to the FPGA and configured to send and receive data between a host controller and the FPGA; and
      a control interface coupled to the FPGA and configured to send and receive monitoring and control data to the host board.

2. The optical module or subassembly according to claim 1, wherein the monitoring and processing circuitry is monolithically integrated onto the optical device or is a multi-chip module integrated on the optical device.

3. The optical module or subassembly according to claim 1, wherein the monitoring and processing circuitry comprises circuitry selected from the group consisting of serialization/deserialization (SerDes), encoding/decoding, scrambling/descrambling, gear-boxing, forward error correction (FEC), laser control and monitoring.

4. The optical module or subassembly according to claim 3, wherein the monitoring and processing circuitry is in a single unit on the optical device.

5. The optical module or subassembly according to claim 1, wherein the monitoring and processing circuitry comprises a self-contained unit having media access control (MAC), physical layer (PHY) and forward error correction (FEC) functions.

6. The optical module or subassembly according to claim 1, wherein one or both of the FPGA and ASIC are programmable to match requirements of a plurality of form factors.

7. A system for use in an optical or optoelectronic device or subassembly, the system comprising:
   one or more optical modules or subassemblies according to claim 1, further comprising one or both of a serialization/deserialization (SerDes) and a physical layer (PHY) in communication with the host board.

8. An optical communication system comprising:
   programmable circuitry including a field programmable gate array (FPGA) in communication with host circuitry;
   monitoring and processing circuitry including an application specific integrated circuit (ASIC) in communication with the programmable circuitry, the ASIC including analog-to-digital conversion (ADC) and digital-to-analog conversion (DAC) functions, wherein the monitoring and processing circuitry is programmable for implementation of physical and transport layer communication specifications for a plurality of different applications; and
   one or more photonic integrated circuits in communication with the monitoring and processing circuitry, wherein the one or more photonic integrated circuits include a thermoelectric cooler (TEC), a transmitter photonic integrated circuit (Tx-PIC), a receiver photonic integrated circuit (Tx-PIC), and a wavelength locker;
   a high bit rate data and clock interface coupled to the FPGA and configured to send and receive data between the host circuitry and the FPGA; and
   a control interface coupled to the FPGA and configured to send and receive monitoring and control data to the host circuitry.

9. The optical communication system according to claim 8, wherein the optical communication system further comprises a serialization/deserialization (SerDes) in communication with and being disposed between the programmable circuitry and host circuitry.

10. The optical communication system according to claim 8, wherein the monitoring and processing circuitry comprises at least one of: cross connects or SerDes.

11. The optical communication system according to claim 8, wherein the optical communication system is configured to receive an input signal having a first Giga bits per second (Gps) rate and produce an output signal having a second Gps rate.

12. The optical communication system according to claim 11, wherein the input signal having a first Gps rate and the output signal having a second Gps rate are programmable to different rates to accommodate the plurality of different applications and linecards.

* * * * *